United States Patent
Govindswamy et al.

(10) Patent No.: US 9,252,863 B2
(45) Date of Patent: Feb. 2, 2016

(54) METHOD AND APPARATUS FOR ADAPTIVE ANTENNA SHARING

(71) Applicant: MBIT WIRELESS, INC., Newport Beach, CA (US)

(72) Inventors: Arumugam Govindswamy, Irvine, CA (US); Bhaskar Patel, San Clemente, CA (US); Sivakumar Govindassamy, San Diego, CA (US)

(73) Assignee: MBIT WIRELESS, INC., Newport Beach, CA (US)

( * ) Notice: Subject to any disclaimer, the term of this patent is extended or adjusted under 35 U.S.C. 154(b) by 0 days.

(21) Appl. No.: 14/242,029

(22) Filed: Apr. 1, 2014

(65) Prior Publication Data

US 2014/0301493 A1   Oct. 9, 2014

Related U.S. Application Data

(60) Provisional application No. 61/808,573, filed on Apr. 4, 2013.

(51) Int. Cl.
| | |
|---|---|
| *H04B 7/02* | (2006.01) |
| *H04B 7/08* | (2006.01) |
| *H04W 24/02* | (2009.01) |

(52) U.S. Cl.
CPC ............ *H04B 7/0817* (2013.01); *H04W 24/02* (2013.01); *H04B 7/0825* (2013.01)

(58) Field of Classification Search
None
See application file for complete search history.

(56) References Cited

U.S. PATENT DOCUMENTS

| | | | | |
|---|---|---|---|---|
| 8,036,658 B2* | 10/2011 | Govindswamy | ..... | H04B 7/0808 455/161.1 |
| 2004/0036651 A1* | 2/2004 | Toda | ..... | H01Q 1/241 342/383 |
| 2005/0020310 A1* | 1/2005 | Nakaya | ..... | H01Q 3/26 455/562.1 |
| 2008/0220807 A1* | 9/2008 | Patel | ..... | H04B 1/0003 455/524 |
| 2009/0180451 A1* | 7/2009 | Alpert | ..... | H04W 72/1215 370/338 |
| 2010/0260147 A1* | 10/2010 | Xing | ..... | H04K 3/226 370/332 |
| 2012/0264473 A1* | 10/2012 | Mujtaba | ..... | H04W 68/00 455/515 |
| 2012/0309401 A1* | 12/2012 | Orjmark | ..... | H04W 72/1215 455/450 |
| 2013/0201890 A1* | 8/2013 | Swaminathan | ..... | H04W 88/06 370/311 |
| 2014/0206414 A1* | 7/2014 | Oh | ..... | H04B 7/0404 455/562.1 |
| 2014/0293874 A1* | 10/2014 | Oh | ..... | H04B 7/024 370/562.1 |

\* cited by examiner

*Primary Examiner* — Daniel Washburn
*Assistant Examiner* — Berhanu Tadese
(74) *Attorney, Agent, or Firm* — Lerner, David, Littenberg, Krumholz & Mentlik, LLP

(57) ABSTRACT

A method and apparatus are disclosed for sharing antennas between modems for two or more different radio access technologies when two or more antennas may be present in a system. A method for coordination between the modem and the corresponding network element as well as the coordination between the two or more radio access technologies is provided. A method for determining when one of the modems does not need some of its antennas is also provided. The sharing of antennas across two or more modems enables efficient use of the antennas which is critical in small form factor mobile communication devices.

30 Claims, 18 Drawing Sheets

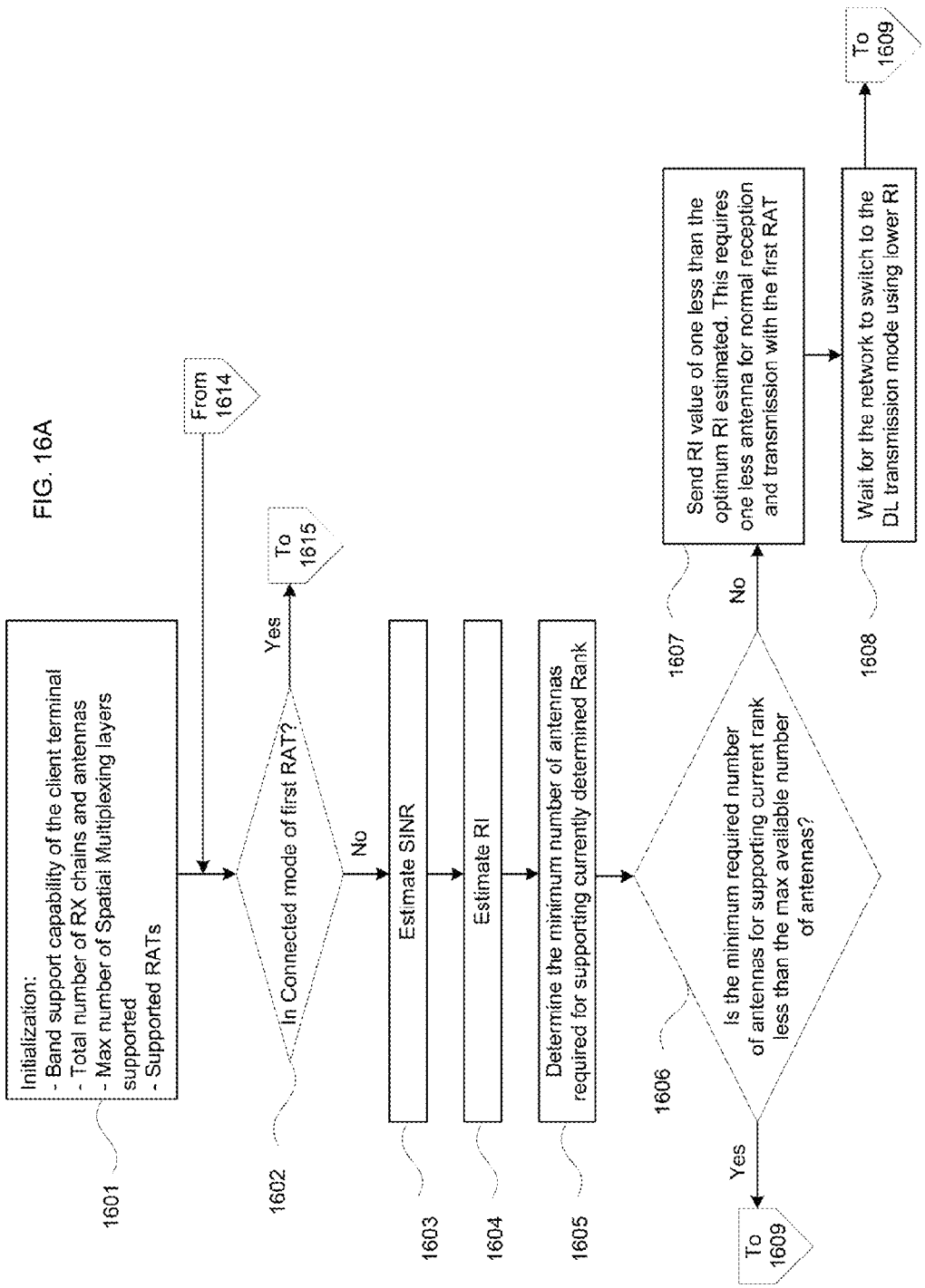

METHOD AND APPARATUS FOR ADAPTIVE ANTENNA SHARING

CROSS-REFERENCE TO RELATED APPLICATIONS

This application claims the benefit of the filing date of U.S. Provisional Application No. 61/808,573, filed Apr. 4, 2013 and entitled "METHOD AND APPARATUS FOR ADAPTIVE ANTENNA SHARING," the entire disclosure of which is hereby expressly incorporated by reference herein.

BACKGROUND OF THE INVENTION

The present invention relates generally to wireless communication systems and, more particularly, to mobile station receiver architectures and methods that employ multiple radio receive chains and antennas.

As shown in FIG. 1, a wireless communication system 10 comprises elements such as a client terminal or mobile station 12 and base stations 14. Other network devices which may be employed, such as a mobile switching center, are not shown. As illustrated, the communication path from the base station ("BS") to the client terminal direction is referred to herein as the downlink ("DL") and the communication path from the client terminal to the base station direction is referred to herein as the uplink ("UL"). In some wireless communication systems the client terminal or mobile station ("MS") communicates with the BS in both DL and UL directions. For instance, this is the case in cellular telephone systems. In other wireless communication systems the client terminal communicates with the base stations in only one direction, usually the DL. This may occur in applications such as paging.

Many wireless communication systems use large number of channels over different frequencies. Each base station in these systems use one or more of the available channels. Therefore the client terminals need to make periodic measurements to choose the best channel for communication. The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor base stations. Similarly, in some wireless communication systems a neighbor base station is normally referred as a neighbor cell. For these wireless communication systems the client terminals or MSs are required to make periodic measurements on other channels belong to serving or neighbor base stations. These measurements may include parameters such as signal strength. To make such measurements the client terminal may need to tune other channels in the communication system.

A discussion of the fundamentals of cellular systems may be found in the text entitled "Mobile Cellular Telecommunications Systems" by William C. Y. Lee, copyright 1989 and published by McGraw-Hill Book Company, the entire disclosure of which is hereby expressly incorporated by reference herein. Another text that details aspects of cellular communication systems is "Wireless and Personal Communications Systems" by Garg and Wilkes, copyright 1996 and published by Prentice Hall PTR, the entire disclosure of which is hereby expressly incorporated by reference herein.

As shown in FIG. 2, client terminal/MS 12 typically includes a baseband subsystem 16 and a radio frequency ("RF") subsystem 18. Memory 20, such as an external memory, is shown connected to the baseband subsystem 16. The baseband subsystem 16 normally consists of a micro controller unit ("MCU") 22, a signal processing unit ("SPU") 24, data converters 26, peripherals 28, power management 30, and memory 32 as shown in FIG. 3. The SPU 24 may be a digital signal processor ("DSP"), hardware ("HW") accelerators, co-processors or a combination of the above. Normally the overall control of the baseband subsystem 16 is performed by software running on the MCU 22 and the processing of signals is done by the SPU 24.

Analog to digital converters ("ADCs") convert a received analog signal into digital for the baseband system to process it. Similarly, digital to analog converters ("DACs") convert the processed baseband digital signal into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally consists of a receiver, a transmitter, a synthesizer, a power amplifier, an antenna, and other components. An RF subsystem 18 for a frequency division duplex ("FDD") system is shown in FIG. 4. Receiver section 34 performs the task of converting the signal from RF to baseband. It includes mixers 36, filters 38, low noise amplifiers ("LNAs") 40 and variable gain amplifiers ("VGAs") 42. Transmitter section 44 performs the task of converting the baseband signal up to the RF. It includes mixers 46, filters 48, and gain control through VGAs 50. Power amplification of the transmit signal is typically done by a separate power amplifier ("PA") unit 52 but is considered part of the transmit RF chain. In some architectures, some of the components of the receiver and transmitter can be shared. As shown, the receiver section 34 and the transmitter section 44 are coupled to an antenna 54 via a transmit/receive switch 56. Synthesizer 58 is also shown as coupling to the receiver section 34 and the transmitter section 44.

Down conversion in the receiver 34 and up conversion in the transmitter 44 can be done in a single stage or multiple stages which lead to different implementations of RF subsystems. One possible implementation is direction conversion or zero intermediate frequency ("IF") where the downlink RF signal is converted to baseband by a single mixer and local oscillator ("LO"). Another implementation employs a super-heterodyne structure which uses one or more IF stages and LOs during the process of converting the RF signal to baseband. Yet another implementation uses an approach called "low IF" that converts the analog RF signal to a low intermediate frequency and then convert the analog intermediate frequency to a digital signal using high speed data converters.

The synthesizer 58 produces the LO frequency needed by the receiver 34 and the transmitter 44 to convert the signal from RF to baseband and to convert from baseband to RF respectively. A frequency synthesizer is an electronic system for generating a range of frequencies from a single fixed reference frequency. Synthesizer 58 normally consists of a phase-frequency discriminator, a charge pump, a loop filter, a voltage controlled oscillator ("VCO") and a frequency divider. One input to the synthesizer is a reference clock frequency and the other input is the desired frequency at the output of the VCO. The desired frequency is converted into an appropriate value for the frequency divider such that the VCO produces the desired frequency.

Typically the process of generating the LO frequency for receiving from or transmitting on a particular RF channel is referred to as "tuning to a channel." The mixers take the LO frequency generated by the synthesizer and multiply the desired signal. The output of the mixer can be filtered appropriately depending on whether down conversion (in receivers) or up conversion (transmitter) is desired.

In case of FDD systems, generally the transmission and reception takes place concurrently. Therefore, it is not possible to share the synthesizer between transmitter and receiver and two separate synthesizers are required.

Often, multiple receive and transmit chains are used in wireless communication systems to improve performance. The performance improvement can be in terms of better coverage, higher data rates, multiplexing of multiple users on the same channel at the same time, or some combination of the above. FIG. 5 illustrates an RF subsystem 60 with two RF receive chains for an FDD system.

As shown, RF subsystem 60 includes a transmitter 62, a synthesizer 64, and a pair of receivers $66_1$ and $66_2$. One of the receivers, $66_1$, and the transmitter 62 are coupled to a first antenna $68_1$ via transmit/receive switch 70. The other receiver, $66_2$, is connected to a second antenna $68_2$. Different techniques using multiple receive and/or transmit chains are often referred to with different names such as diversity combining (maximum ratio combining, equal gain combining, selection combining, etc.), space-time coding or space-time block coding, and multiple input multiple output ("MIMO").

In a traditional receiver with multiple chains, whenever the multiple receive chains are used they are all tuned to the same channel.

For instance, conventional multiple receive chain systems may employ multiple antennae and multiple RF chains as shown in FIG. 6. As shown, system 76 includes multiple receive chains $78_1, 78_2, \ldots, 78_N$. Each receive chain 78 is coupled to a respective antenna $80_1, 80_2, \ldots, 80_N$. Synthesizer 82, which is fed by a reference oscillator 83, couples to each of the receive chains 78 and to baseband processor 84. The synthesizer 82 provides a local oscillator signal LO to the receive chains 78. And the baseband processor 84 includes respective in-phase and quadrature ("I/Q") ADCs $86_1, 86_2, \ldots, 86_N$ that couple to respective ones of the receive chains 78.

In multiple receive chain systems, typically the antennae are designed to cover the entire frequency band of operation. However, the RF signal chains are tuned to a particular channel in the frequency band of operation. Commonly in a multiple receive chain MIMO configuration all RF signal chains are tuned to the same exact synthesizer frequency. The signals in all RF chains are different primarily because of different positions of the various antennae $80_1, 80_2, \ldots, 80_N$.

In mobile communication systems, the MS typically communicates with one cell, normally referred to as serving cell. To facilitate mobility while maintaining continuous link with the serving cell in the network, the MS must periodically find, receive, update, and manage information about neighbor cells by performing signal measurements on them.

A wireless communication system may use different Radio Access Technologies ("RAT"). For example, a wireless communication system may support Global System for Mobile Communications ("GSM") RAT, Third Generation Partnership Project 2 Code division multiple access ("3GPP2 CDMA") RAT, Universal Mobile Telecommunications System ("UMTS") RAT, Third Generation Partnership Project Long Term Evolution ("3GPP LTE") RAT, or any combination of the RATs. A single MS may support multiple RATs. For example, an MS may support GSM, CDMA, UMTS, LTE or any combination of the RATs. In some systems such as UMTS and LTE, support exists for making measurements on other RATs while being connected to UMTS or LTE network using compressed mode or measurement gap respectively. On the other hand, some combination of RATs may be such that it may not be possible or difficult when one RAT is in the connected mode to make measurements on the other RAT without significant interruption in service in the connected mode RAT. For example, when client terminal is connected to an LTE network, and if measurements are required for the CDMA network, the required time for the measurements may exceed the measurement gap provided by the LTE network.

Many RATs such as LTE employ different transmission modes to adapt to the prevailing signal conditions. The different transmission modes are transmit diversity, spatial multiplexing, beamforming, etc., and may require different number of antennas for proper operation. The network may use a particular transmission mode based on measurement reports provided by the client terminals.

In order to perform neighbor cell reception in some situations, the MS either has to switch between serving cell and neighbor cell or have additional dedicated RF signal chains that can be tuned to a different channel for neighbor cell reception as shown in FIG. 7. As shown here in system 76', an additional RF receive chain 88 having an antenna 89 is employed for a neighbor cell. Receive chain 88 couples to a respective I/Q ADC 90 in the baseband processor 84. Furthermore, an additional synthesizer 92 receives input from reference oscillator 94 and the baseband processor 84 and provides a LO signal to the RF receive chain 88.

Unfortunately, existing wireless systems implementing multiple receive chains have various drawbacks and disadvantages. For instance, switching between a serving cell and a neighbor cell may result in performance degradation. And employing additional dedicated RF chains for neighbor cell reception leads to additional cost, power consumption and space requirements in the MS. Thus, there is a need for improved architectures that efficiently employ multiple receive chains.

SUMMARY OF THE INVENTION

In one embodiment as discussed herein, a communication subsystem for use in a wireless mobile station is provided. The communication subsystem comprises a first modem configured to support a first radio access technology and a second modem configured to support a second radio access technology. The first modem includes a first radio frequency subsystem including a transmitter and a plurality of receive chains respectively configured to transmit and receive information according to the first radio access technology. The second modem includes a second radio frequency subsystem including a transmitter and a plurality of receive chains respectively configured to transmit and receive information according to the second radio access technology. The first and second modems are communicatively coupled via an intermodem communication link. The communication subsystem also includes one or more first frequency synthesizers coupled to the transmitters of the first and second modems, and one or more second frequency synthesizers coupled to the pluralities of receive chains of the first and second modems. The one or more first frequency synthesizers are configured to generate local oscillating signals for the transmitters. And the one or more second frequency synthesizers are configured to generate local oscillating signals for the pluralities of receive chains. The transmitter and the plurality of receive chains of the first modem are coupled to at least two antennas through one or more multiplexers, and the transmitter and the plurality of receive chains of the second modem are coupled to the at least two antennas through the one or more multiplexers. When a given one of the first and second modems is in active communication, via a first one of the at least two antennas, with a wireless communication network according to that modem's radio access technology, the other one of the first and second modems is configured to simultaneously use another one of the at least two antennas to measure one or more signal or network parameters associated with that modem's radio access technology.

In one example, the given modem is configured to determine whether to use only one of its plurality of receive chains and the first antenna or two or more of its plurality of receive chains and the at least two antennas for the given modem's active connection, based on a prevailing downlink transmission mode and signal conditions. In this case, when the given modem determines to use only one of its plurality of receive chains and the first antenna, the given modem may be configured to inform the other modem, via the inter-modem communication link, of the determination. Here, when the other modem is informed of the determination, the other modem may be configured to control the other one of the at least two antennas via the one or more multiplexers, and to take measurements of the one or more signal or network parameters. Upon completion of the measurements, the other modem may return control of the other one of the at least two antennas to the given modem.

In another example, the first modem and the second modem support multiple frequency bands, and each of the first and second modems is configured to perform measurements of the one or more signal or network parameters with that modem's radio access technology utilizing the at least two antennas via the one or more multiplexers. In a further example, the given modem is configured to perform signaling with the wireless communication network to ensure that the given modem is able to free up the other one of the at least two antennas for a selected duration to enable the other modem to perform the measurements.

In yet another example, the given modem is configured to use the first antenna for primary receive and transmit operations and is configured to use the other one of the at least two antennas for diversity reception, while the other modem is configured to use the other one of the at least two antennas for primary receive and transmit operations and is configured to use the first antenna for diversity reception.

And in another example, the first modem includes a first baseband subsystem communicatively coupled to the first radio frequency subsystem and the second modem includes a second baseband subsystem communicatively coupled to the second radio frequency subsystem.

According to another embodiment as discussed herein, a wireless mobile station comprises a baseband subsystem including a controller and a signal processing unit operatively connected to the controller, a first radio frequency subsystem operatively connected to the baseband subsystem and a second radio frequency subsystem operatively connected to the baseband subsystem. The first radio frequency subsystem includes a transmitter and a plurality of receive chains respectively configured to transmit and receive information according to a first radio access technology. The second radio frequency subsystem includes a transmitter and a plurality of receive chains respectively configured to transmit and receive information according to a second radio access technology. The first and second radio subsystems are communicatively coupled via a communication link. The wireless mobile station also includes one or more first frequency synthesizers coupled to the transmitters of the first and second radio subsystems, the one or more first frequency synthesizers configured to generate local oscillating signals for the transmitters; and one or more second frequency synthesizers coupled to the pluralities of receive chains of the first and second radio frequency subsystems, the one or more second frequency synthesizers configured to generate local oscillating signals for the pluralities of receive chains. The transmitter and the plurality of receive chains of the first radio frequency subsystem are coupled to at least two antennas of the wireless mobile station through one or more multiplexers, and the transmitter and the plurality of receive chains of the second radio frequency subsystem are coupled to the at least two antennas through the one or more multiplexers. When a given one of the first and second radio frequency subsystem is in active communication, via a first one of the at least two antennas, with a wireless communication network according to that radio frequency subsystem's radio access technology, the other one of the first and second radio frequency subsystems is configured to simultaneously use another one of the at least two antennas to measure one or more signal or network parameters associated with that radio frequency subsystem's radio access technology.

In one example, the given radio frequency subsystem is configured to determine whether to use only one of its plurality of receive chains and the first antenna or two or more of its plurality of receive chains and the at least two antennas for the given radio frequency subsystem's active connection, based on a prevailing downlink transmission mode and signal conditions. In this case, when the given radio frequency subsystem determines to use only one of its plurality of receive chains and the first antenna, the given radio frequency subsystem may be configured to inform the other radio frequency subsystem, via the communication link, of the determination. Here, when the other radio frequency subsystem is informed of the determination, the other radio frequency subsystem may be configured to control the other one of the at least two antennas via the one or more multiplexers, and to take measurements of the one or more signal or network parameters. And upon completion of the measurements, the other radio frequency subsystem may return control of the other one of the at least two antennas to the given radio frequency subsystem.

In another example, the first and the second radio frequency subsystems each support multiple frequency bands. Each of the first and second radio frequency subsystems is configured to perform measurements of the one or more signal or network parameters with that radio frequency subsystem's radio access technology utilizing the at least two antennas via the one or more multiplexers. In a further example, the given radio frequency subsystem is configured to perform signaling with the wireless communication network to ensure that the given radio frequency subsystem is able to free up the other one of the at least two antennas for a selected duration to enable the other radio frequency subsystem to perform the measurements.

According to another example, the given radio frequency subsystem is configured to use the first antenna for primary receive and transmit operations and is configured to use the other one of the at least two antennas for diversity reception, and the other radio frequency subsystem is configured to use the other one of the at least two antennas for primary receive and transmit operations and is configured to use the first antenna for diversity reception.

And in yet a further example, the baseband subsystem comprises a first baseband subsystem having a first one of the controllers and a first one of the signal processing units, and a second baseband subsystem having a second one of the controllers and a second one of the signal processing units. In this case, the first radio frequency subsystem is operatively connected to the first baseband subsystem, and the second radio frequency subsystem is operatively connected to the second baseband subsystem.

And according to a further embodiment as discussed herein, a method of communication in a wireless mobile station having a first modem configured to support a first radio access technology and a second modem configured to support a second radio access technology is provided. The method comprises determining, by one or more processing devices of the wireless mobile station, a required minimum number of antennas for supporting a rank determined by rank indication estimation, the rank identifying a number of layers in a spatial multiplexing mode; determining, by the one or more processing devices, whether the required minimum number of antennas is less than a maximum available number of antennas of the wireless mobile station; when the required minimum number of antennas is less than the maximum available number of antennas: selecting which particular antenna of the wireless mobile station is to be shared, by the first modem, with the second modem, the selection being based on an estimated signal to interference and noise ratio (SINR) for each antenna; the first modem providing an indication to the second modem about the selected antenna to be shared; and switching a connection for the selected antenna to the second modem.

In one example, the method further comprises, after switching the connection, the second modem performing measurements of one or more signal or network parameters associated with the second modem's radio access technology using the selected antenna. In one alternative, the method further comprises, after performing the measurements, routing control of the selected antenna back to the first modem. In this case, the second modem may provide an indication to the first modem that the selected antenna is assigned back to the first modem. In another alternative, an antenna having the lowest SINR is selected to be shared to the second modem for measurements. In a further alternative, the wireless mobile station alternates between two different antennas for each measurement event. According to another alternative, selection of the particular antenna is performed according to a frequency band of the second modem for which measurements are to be made.

In another example, when the required minimum number of antennas is equal to the maximum available number of antennas, the wireless mobile station reports to a wireless communication network a rank indication value of one less than the estimated rank indication. In this case, the method may further include waiting for the wireless communication network to start downlink transmission using a last reported rank indication as a transmission mode.

And according to another example, when the wireless mobile station is not in a connected mode in either of the first or second modems, sharing of the antennas of the wireless mobile station is performed without dependence on the SINR or rank indication of a current transmission mode.

In accordance with an embodiment of the present invention, a wireless mobile station 100 is provided. The mobile station comprises two or more modems 102, one for each of the supported RAT, as shown in FIG. 8. The modem for each RAT comprises a baseband subsystem 104 and a radio frequency subsystem 106. The baseband subsystem includes a controller and a signal processing unit operatively connected to the controller, for instance as discussed above with regard to FIG. 3. The radio frequency subsystem is operatively connected to the baseband subsystem. The radio frequency subsystem includes a transmitter, a plurality of radio frequency receive chains and a separate synthesizer for the transmitter and receiver. The transmitter is operable to obtain transmit signals from the baseband subsystem, process the transmit signals and to send out the processed transmit signals from the wireless mobile station. A first synthesizer is operable to generate a local oscillating signal and is connected to the transmitter. The plurality of radio frequency receive chains are operable to receive signals from at least one base station, to process the received signals and to send the processed received signals to the baseband subsystem. The radio frequency receive chains receive the local oscillating signal from the second synthesizer. The second radio frequency receive chain also receives the local oscillating signal from the same synthesizer. This arrangement is also shown in FIG. 17.

According to an aspect of the present invention, the modems for the two or more RATs may share the RF antennas as shown in the example system 200 of FIG. 9. An MS with two receive chains in both the modems is considered for illustration purposes. Also, in this example, one of the two RATs ($202_1$) is 3GPP LTE and the other RAT ($202_2$) is 3GPP2 CDMA 1X. According to an aspect of the present invention, the two RATs share the same RF antennas $204_1$ and $204_2$. According to another aspect of the present invention, the LTE modem uses the first antenna for its primary ("Main") receive and transmit operation and it uses the second antenna for the diversity ("Div") or MIMO (Spatial Multiplexing) reception whereas the CDMA modem uses the first antenna for diversity reception and uses the second antenna for the primary receive and transmit operation. According to an aspect of the present invention, the MS may be engaged in active connection in one of the two RATs and simultaneously able to make measurements on the other RAT. Each antenna has a switch 206 connected thereto. As discussed in detail below, each switch may be controlled by one or both of the RATs 202.

According to another aspect of the invention, the LTE modem is able to determine whether it needs only one receive chain and antenna or both receive chains and antennas for its active connection based on the prevailing DL Transmission mode and signal conditions estimation such as Signal to Interference and Noise Ratio ("SINR") and Rank Indication ("RI"). The RI is a metric indicating whether Spatial Multiplexing is possible or not under any given conditions. According to another aspect of the invention, when the LTE modem does not require both the antennas for active connection, it informs the CDMA modem about this condition. According to a further aspect of the invention, the control of the RF switch is performed by coordination between the two modems. According to another aspect of the invention, when LTE modem informs about the second antenna not required by it, the CDMA modem coordinates to control the RF switch to the selected RF path from the CDMA modem to be connected. An example of such coordination may be using a 2-to-1 mux 208 for controlling the RF switch such that each modem is able to control the RF switch as required. According to another aspect of the invention, when the CDMA modem has finished performing measurements, it informs the LTE modem, which in turn resumes the use of second antenna if required.

According to another aspect of the invention, both the LTE and CDMA modems (or other types of RAT modems) may support multiple frequency bands. Each modem may select to perform measurements on one of the bands and control the RF switch accordingly. An example 250 of this is shown in FIG. 10 for two bands for both the LTE modem and the CDMA modem. The RF 252 switches in the example 250 of FIG. 10 now have four ports and each mux line 254 is configured to select one of the four ports.

According to another aspect of the invention, if required, the LTE modem may perform signaling with the network to ensure the LTE modem is able to free up the second antenna for a short, selected, duration to enable the CDMA modem to perform measurements. This duration may be, e.g., on the order of milliseconds, tenths of a second, or seconds, depending on the measurements and other requirements of the modems. The LTE modem signaling may include temporary disabling of the Spatial Multiplexing mode by sending Channel State Information ("CSI"), indicating that Spatial Multiplexing may not possible at the time of the measurements.

BRIEF DESCRIPTION OF THE DRAWINGS

FIGS. 16A-B illustrate the flow chart which describes the processing steps for antennas sharing in accordance with the aspects of the present invention.

DETAILED DESCRIPTION

Figure 1:
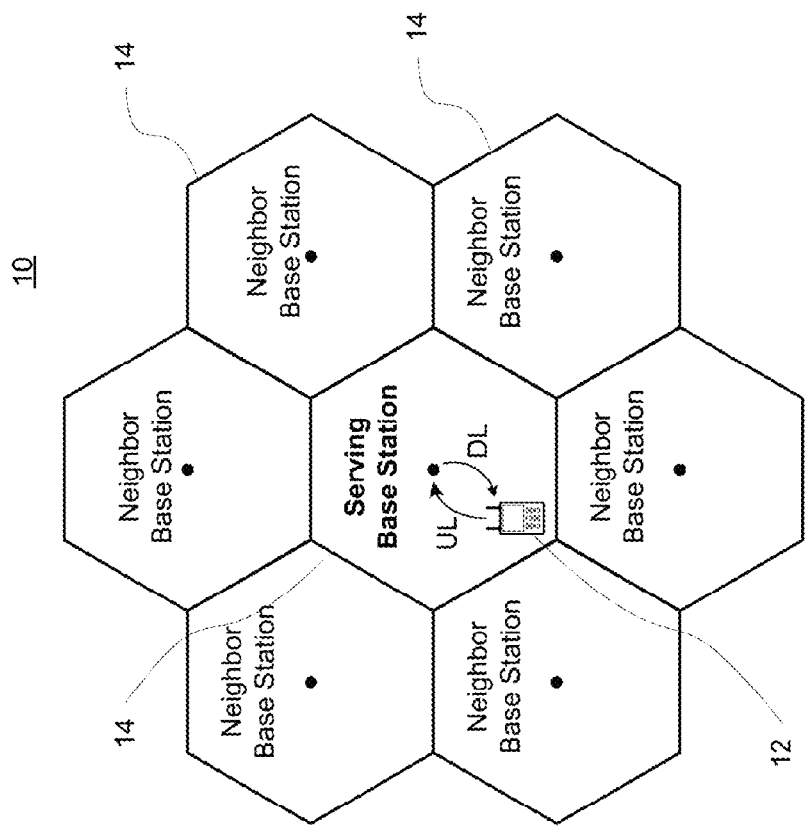
FIG. 1 illustrates a conventional wireless cellular communication system.
Figure 2:
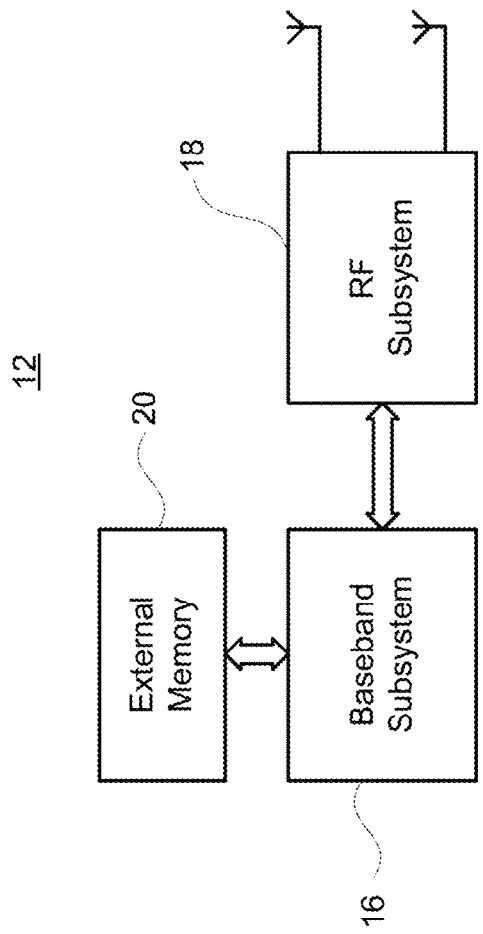
FIG. 2 illustrates a wireless mobile station diagram.
Figure 3:
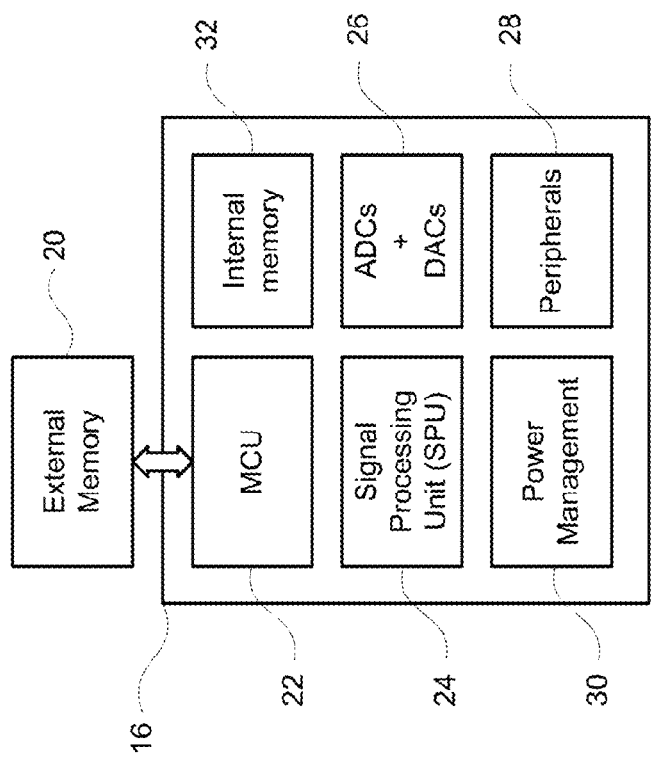
FIG. 3 illustrates a baseband subsystem for a wireless mobile station.
Figure 4:
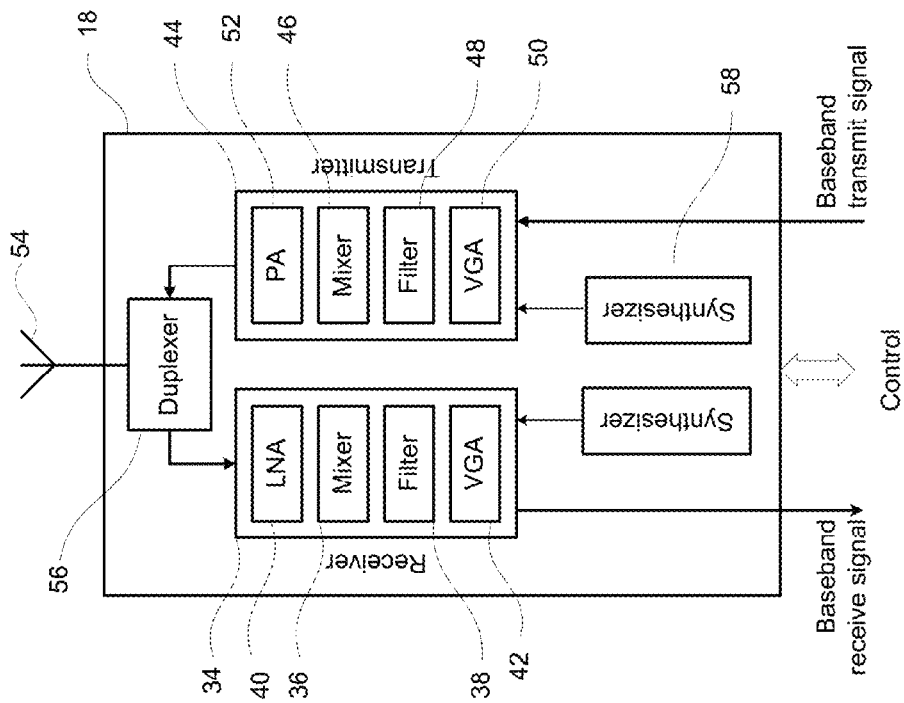
FIG. 4 illustrates an RF subsystem for a wireless mobile station.
Figure 5:
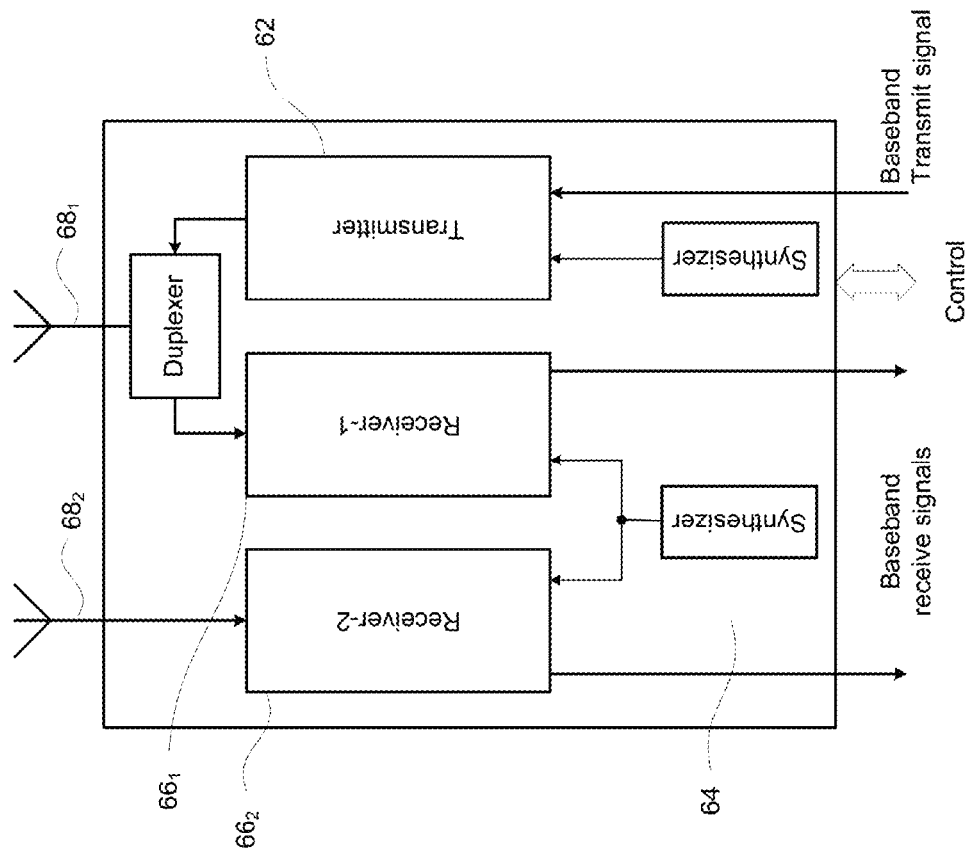
FIG. 5 illustrates an RF subsystem for a wireless mobile station having two receive chains.
Figure 6:
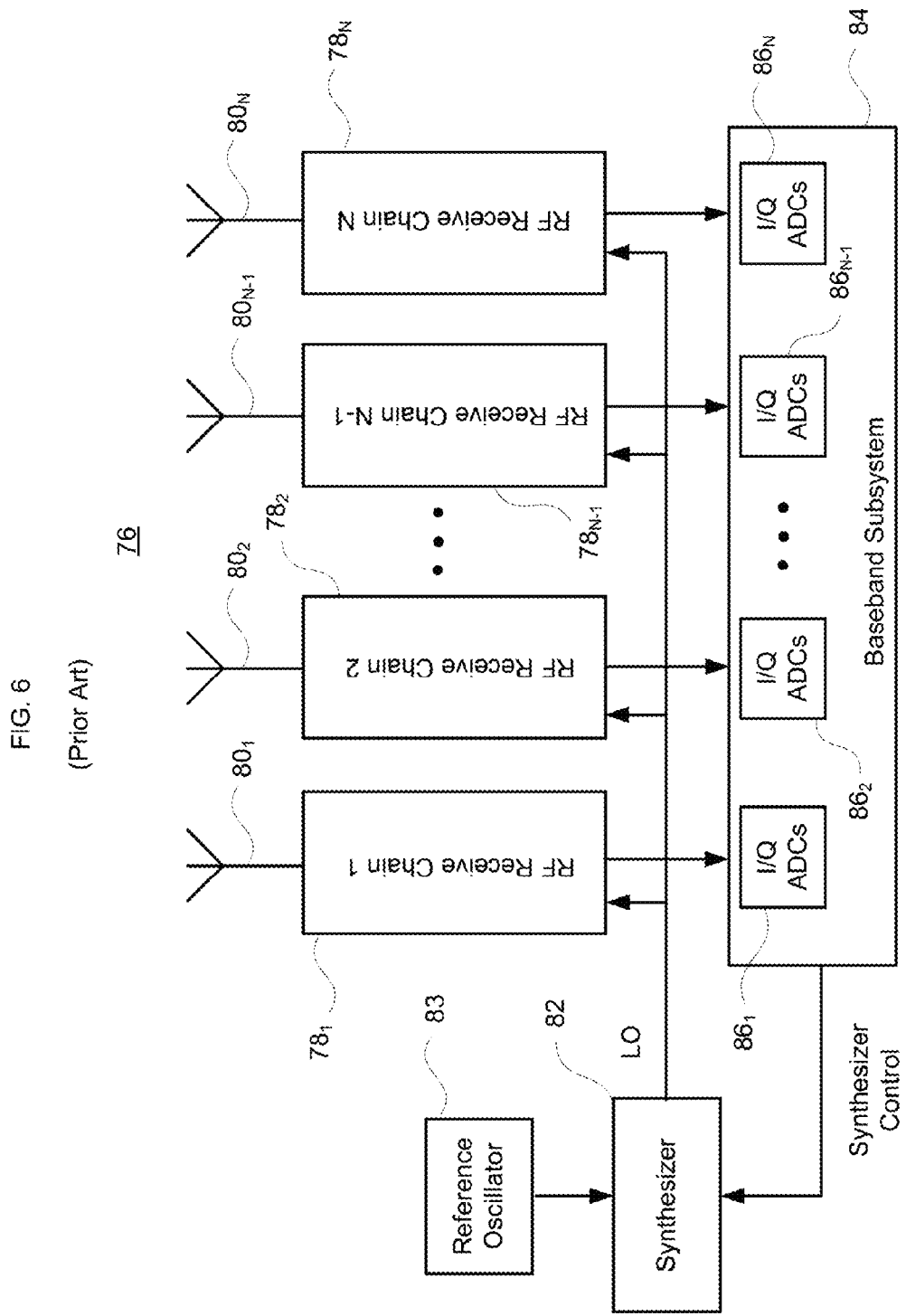
FIG. 6 illustrates a conventional MIMO architecture for a wireless mobile station.
Figure 7:
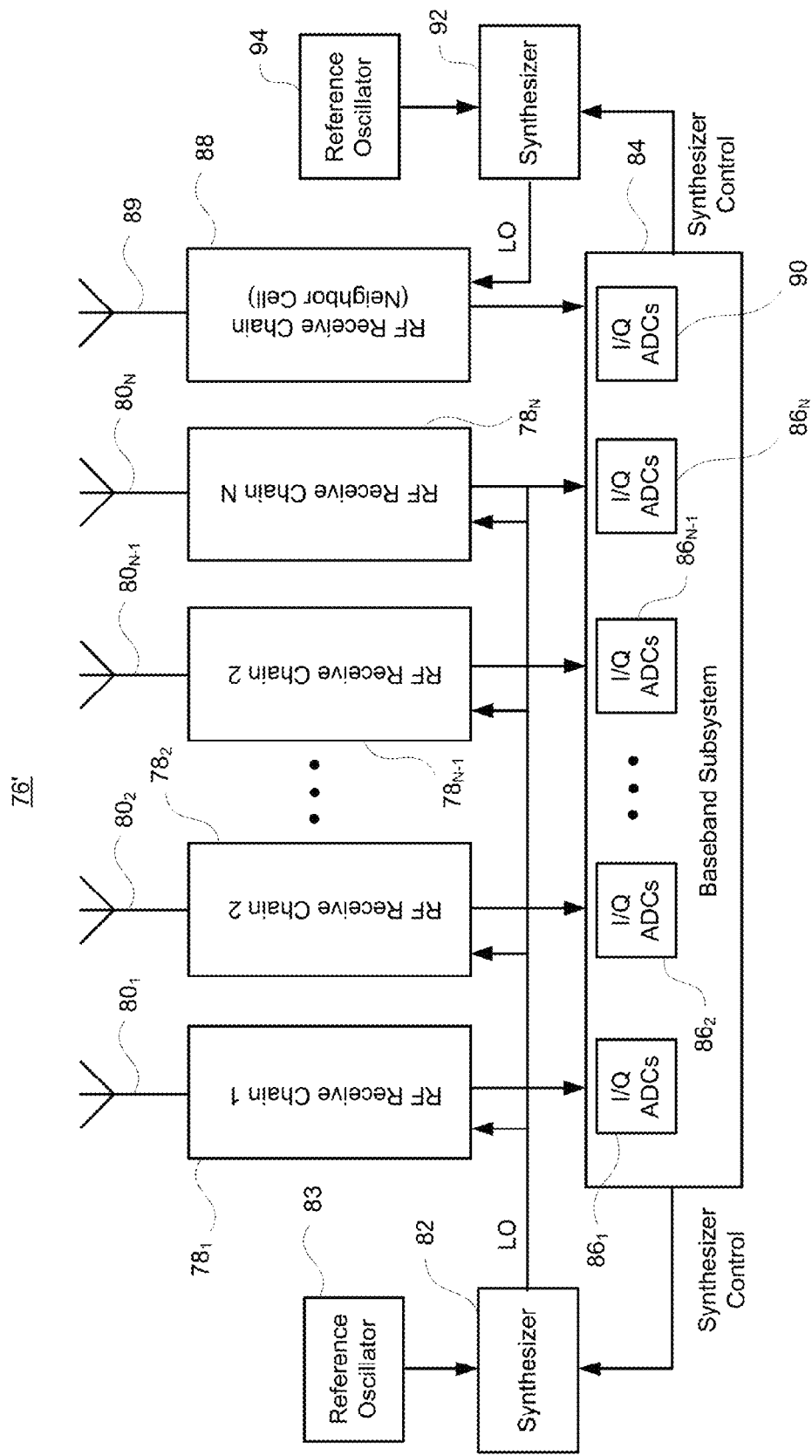
FIG. 7 illustrates another conventional MIMO architecture for a wireless mobile station.
Figure 8:
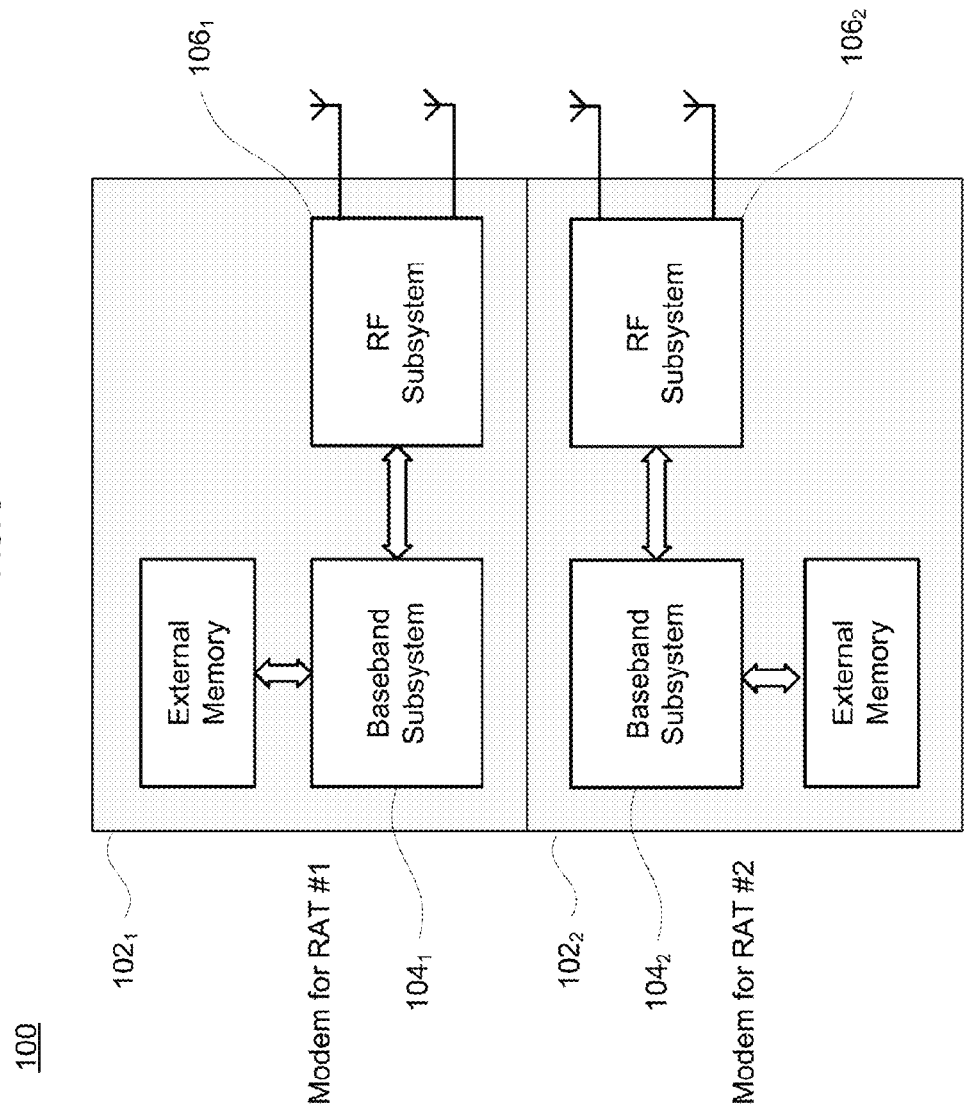
FIG. 8 illustrates a Mobile Station with modems for two different Radio Access Technologies.
Figure 9:
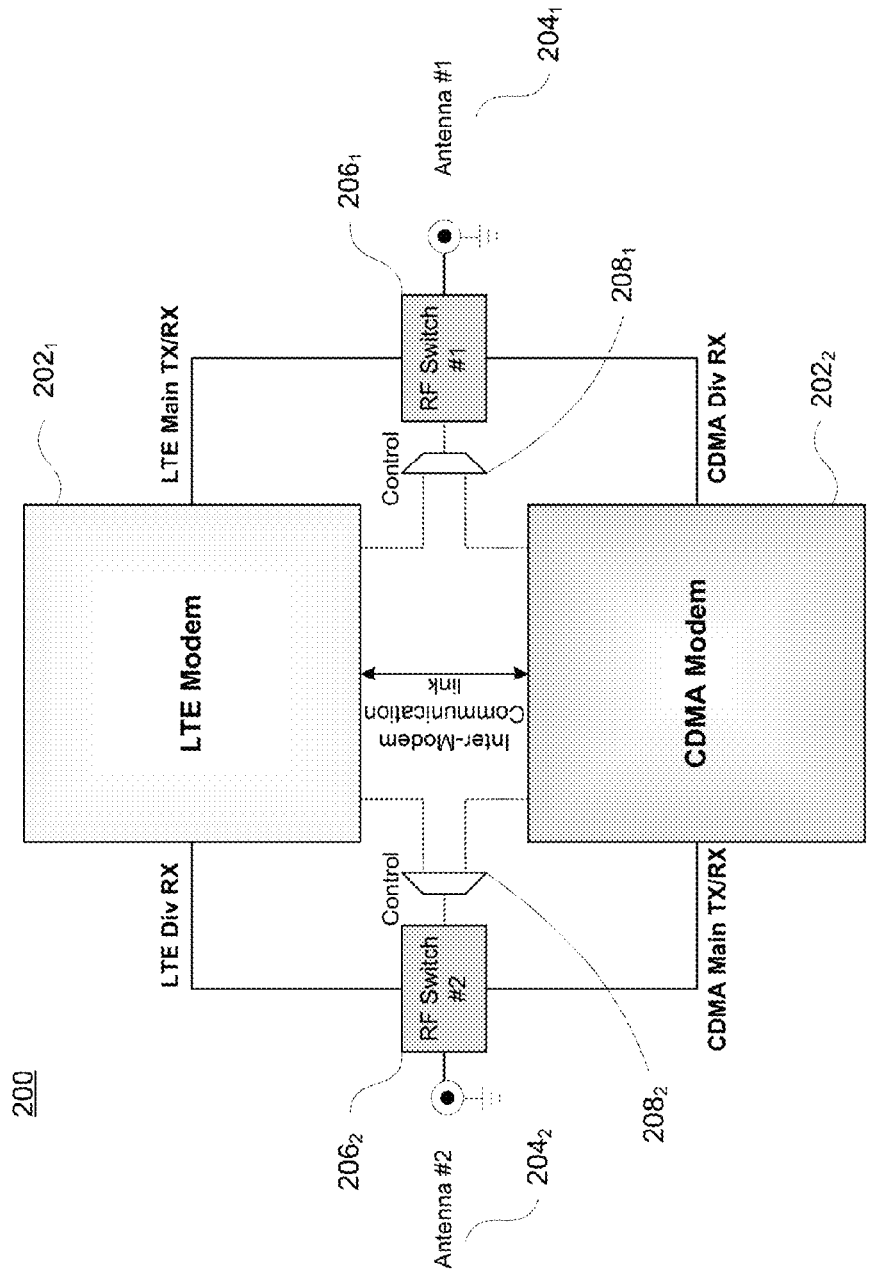
FIG. 9 illustrates a Mobile Station RF antenna connection in accordance with aspects of the present invention.

The foregoing aspects, features and advantages of the present invention will be further appreciated when considered with reference to the following description of preferred embodiments and accompanying drawings, wherein like reference numerals represent like elements. In describing preferred embodiments of the invention illustrated in the appended drawings, specific terminology will be used for the sake of clarity. However, the invention is not intended to be limited to the specific terms used.

In some wireless communication systems that have a serving BS and neighbor BSs, the client terminals or MSs need to make periodic measurements on other channels of the serving and neighbor base stations. To make such measurements the client terminal/MS may need to tune to other channels in the communication system. This may lead to interruption and degradation in the quality of service for the ongoing communication with the serving BS.

In analyzing the aforementioned problems with existing wireless systems, it has been discovered that when a client terminal or MS contains multiple receive chains and antennas, it does not always need to use all the receive chains and antennas. Furthermore, it has also been discovered that it may be possible to know or calculate ahead of time when one or more receive chains are not needed for normal operation. For instance, in accordance with an embodiment of the present invention, a preferred method involves the use of one or more receive chains for measurement purposes while maintaining communication with the currently serving base station.

As will be shown below, the aforementioned features are particularly applicable to MIMO systems, although the invention is well suited to a wide range of other applications as well.

Figure 11:
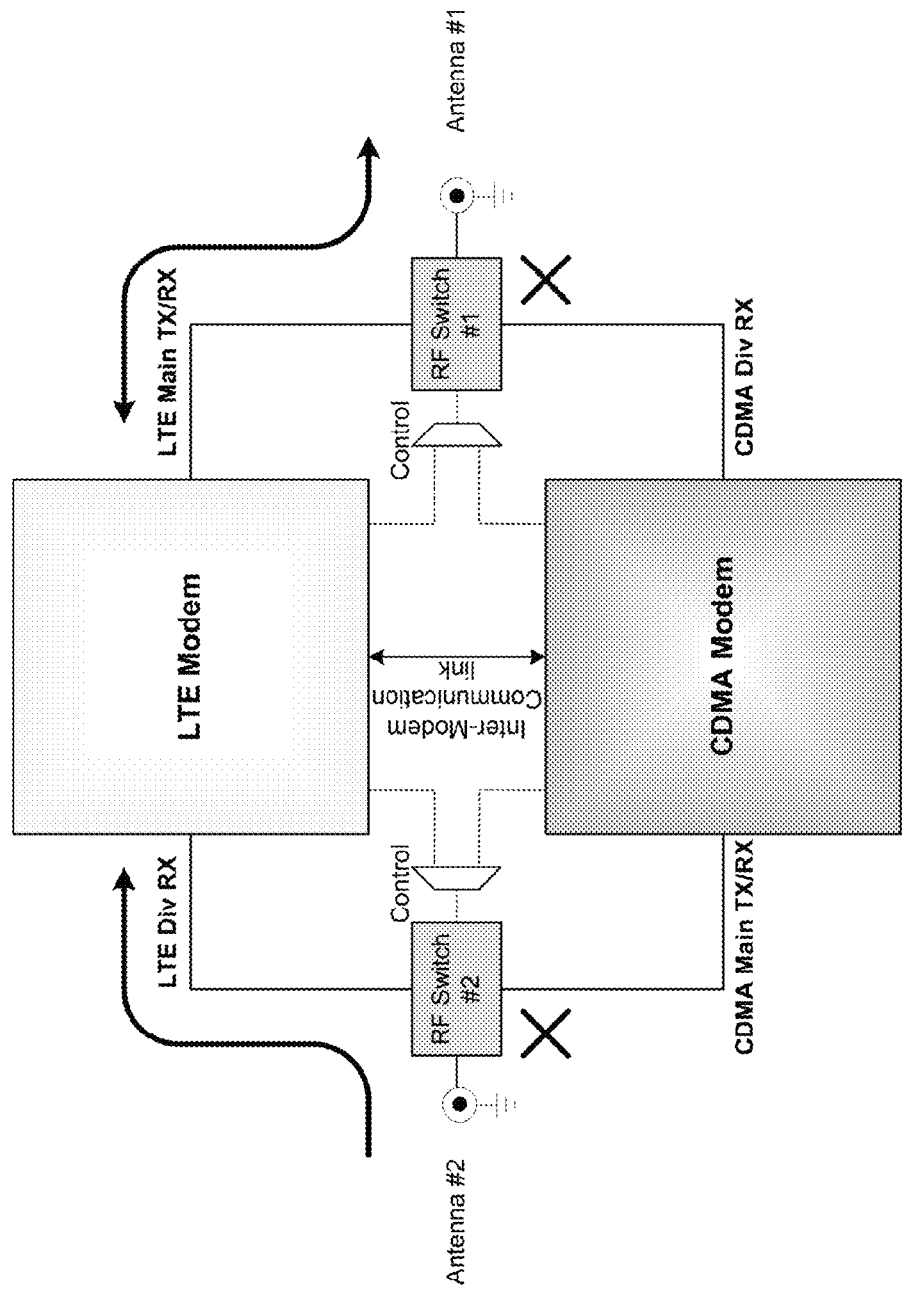
FIG. 11 illustrates the antenna usage and signal flow for LTE only operation
Figure 12:
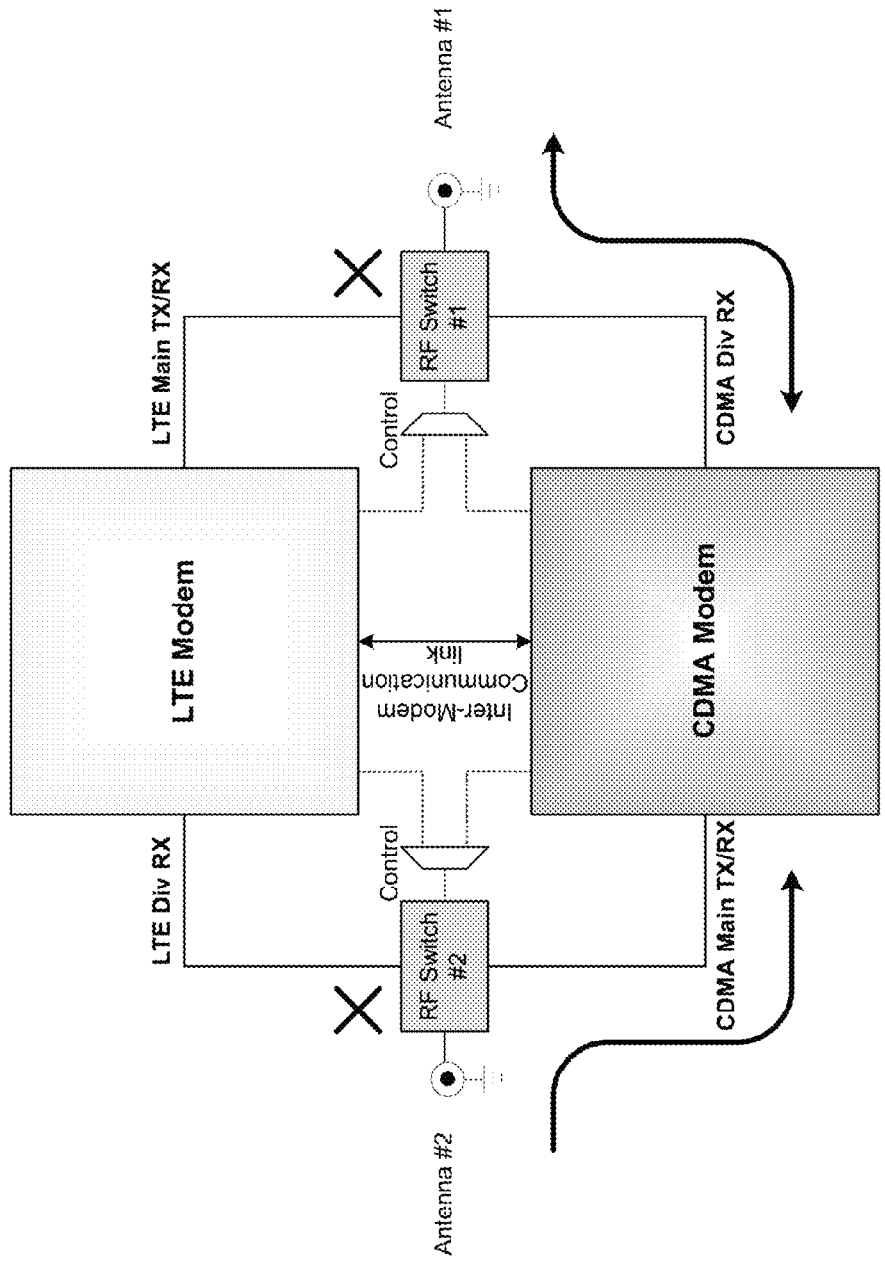
FIG. 12 illustrates the antenna usage and signal flow for CDMA only operation.

In a typical MIMO mobile communication system, normally both the antennas are used for communication by the currently active RAT. FIG. 11 shows a scenario in which both of the antennas are used for LTE modem operation, and FIG. 12 shows a scenario in which both of the antennas are used for CDMA modem operation. Periodically the MS may not need to use some of the RF antennas for a portion of the time. In accordance with one aspect of the invention, the MS may take advantage of this situation by dynamically allocating one of the RF antennas for serving cell reception in one RAT and the remaining RF antenna(s) for neighbor cell reception simultaneously using the other RAT. Note that the RF receive chains for the modem of the two RATs are independent and can be tuned to different frequencies.

Figure 13:
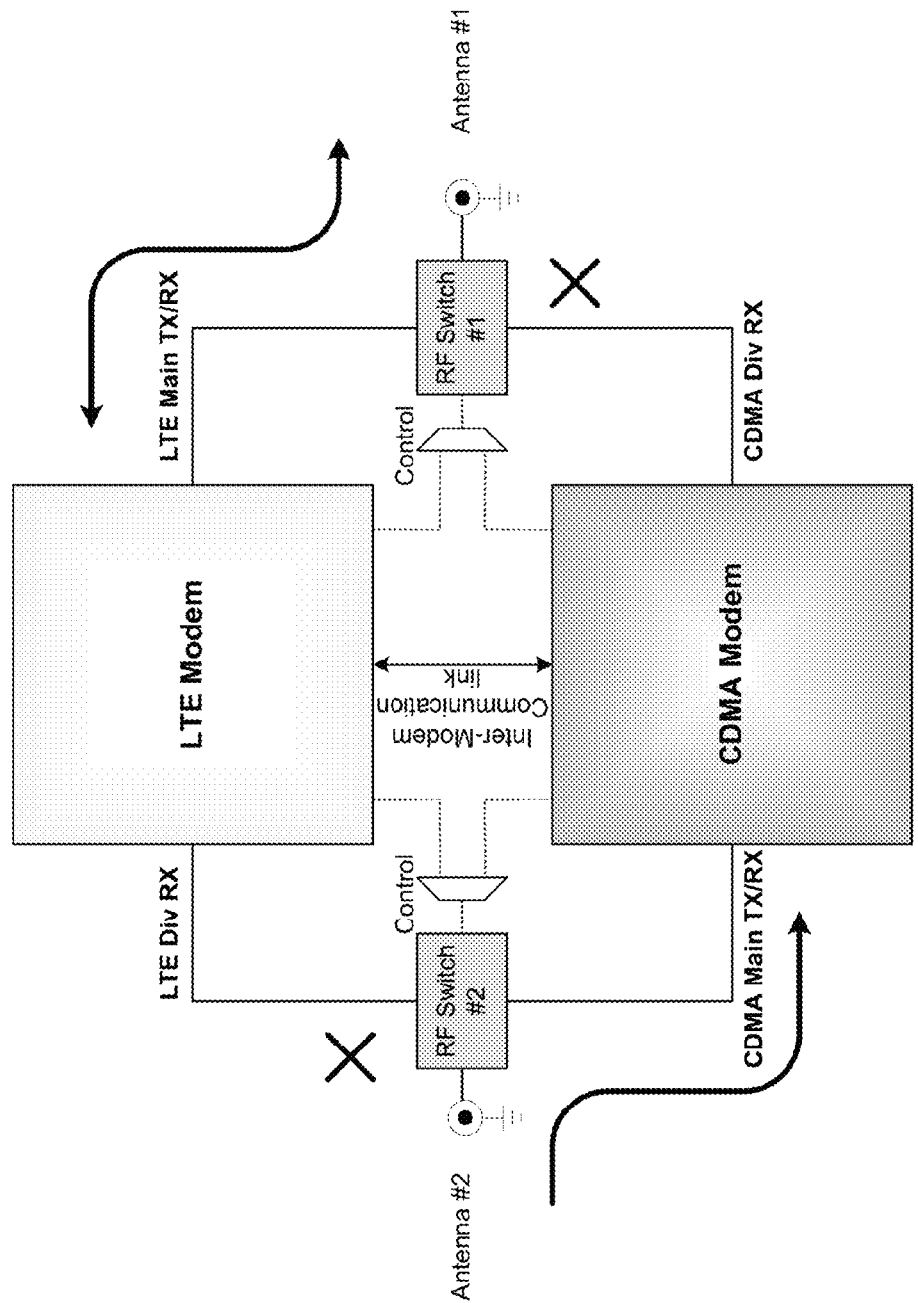
FIG. 13 illustrates the antenna usage and signal flow for active connection in one modem and neighbor cell measurements in the other modem.
Figure 14:
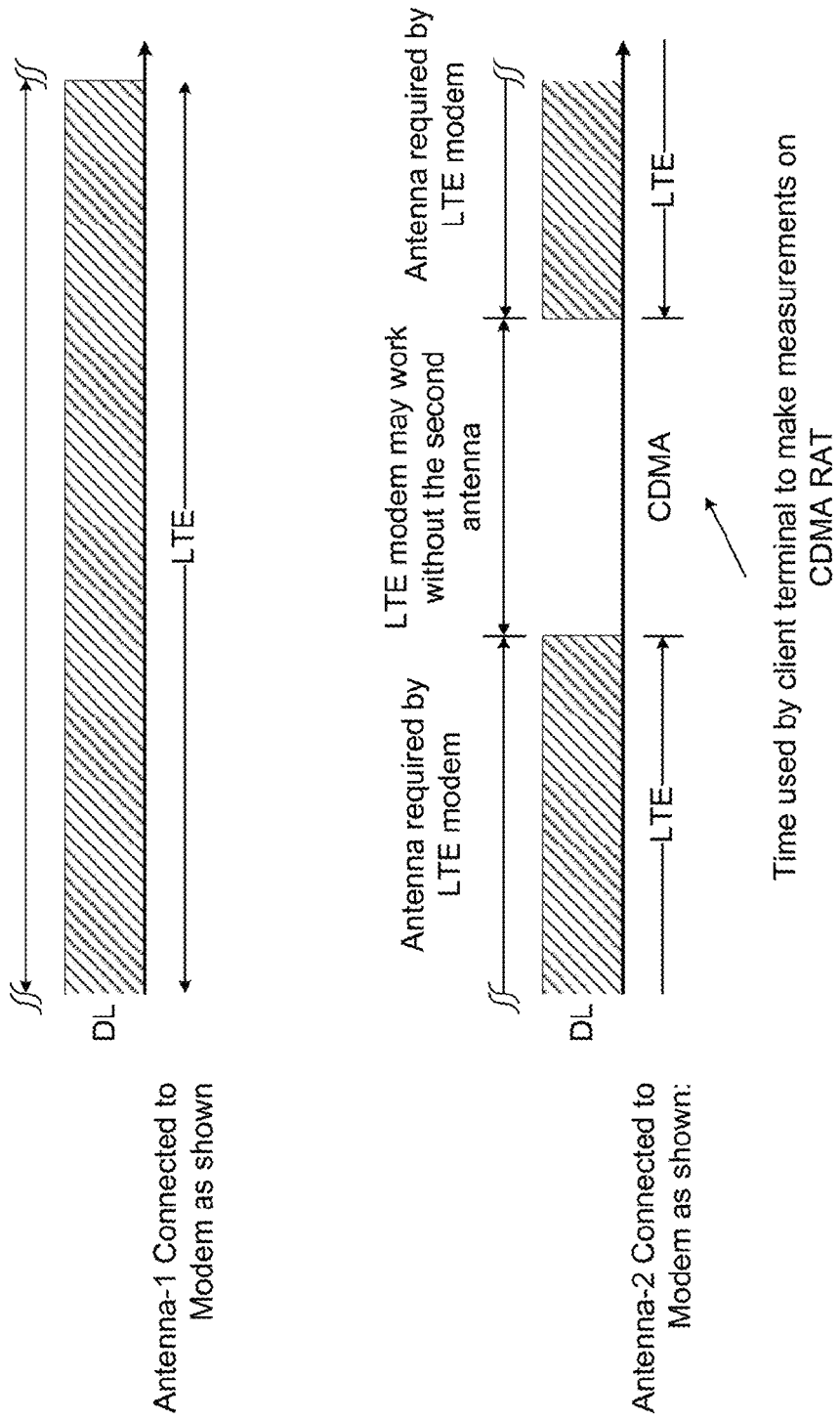
FIG. 14 illustrates the antenna usage for the two modem as a function of time when LTE modem is an active connection and CDMA modem is performing measurements.
Figure 15:
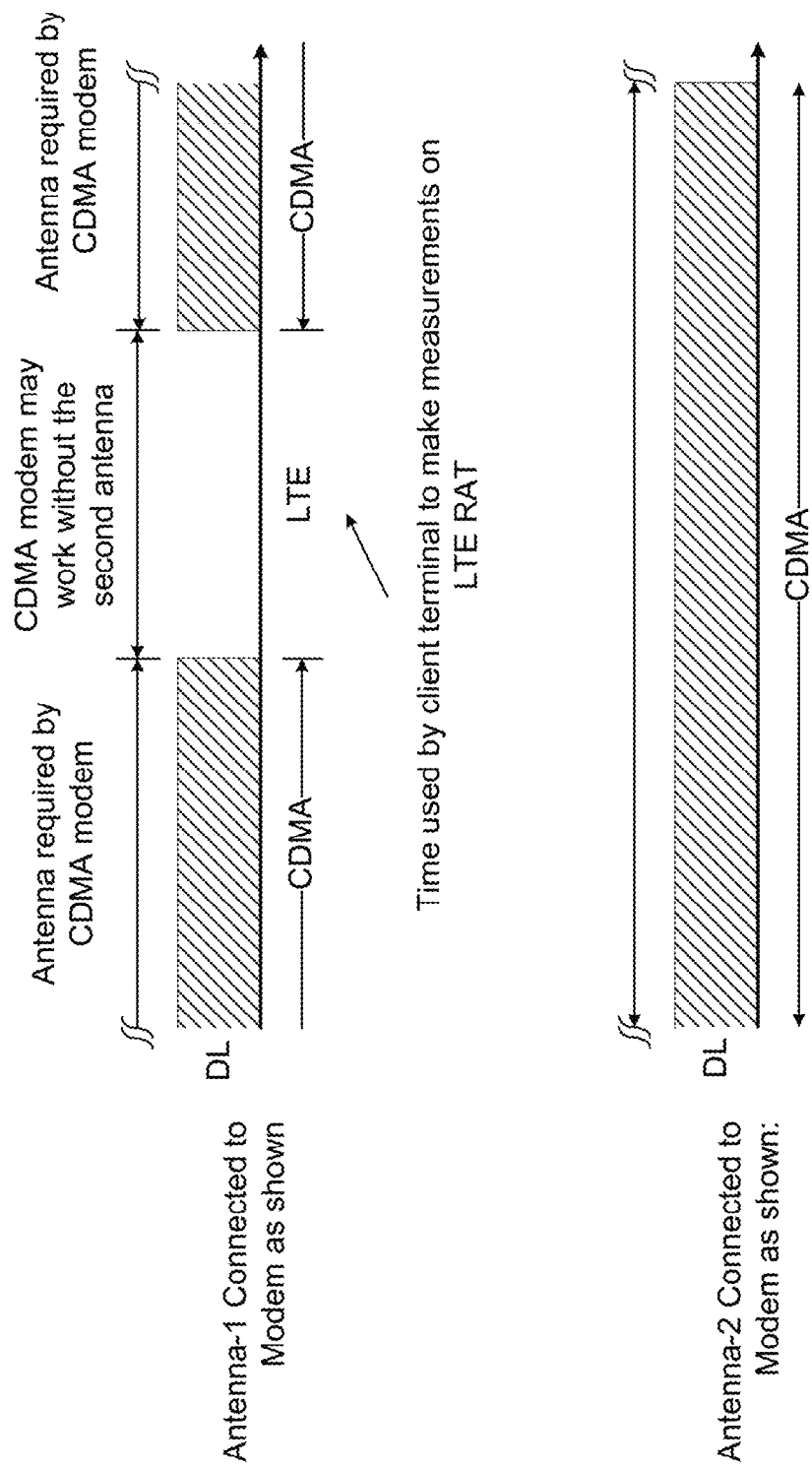
FIG. 15 illustrates the antenna usage for the two modem as a function of time when CDMA modem is an active connection and LTE modem is performing measurements.

FIG. 13 shows an example of a case where the first antenna is connected to the LTE modem and the second antenna is connected to the CDMA modem. This configuration may be used for the case where LTE modem is engaged in active connection and CDMA modem is performing neighbor cell measurements. The same configuration may also be used for an active connection for the CDMA modem and neighbor cell measurements in the LTE modem. FIG. 14 shows the adaptive usage of the antennas by the two modems as a function of time for the case where the LTE modem has an active connection and CDMA modem is performing measurements. As shown, the first antenna is connected to the LTE modem for the entire duration of time in the time window. In contrast, the second antenna is initially connected to the LTE modem, then connected to the CDMA modem, and then reconnected to the LTE modem. FIG. 15 shows another example in which the adaptive usage of the antennas by the two modems as a function of time for the case where the CDMA modem has an active connection and LTE modem is performing measurements.

Figure 10:
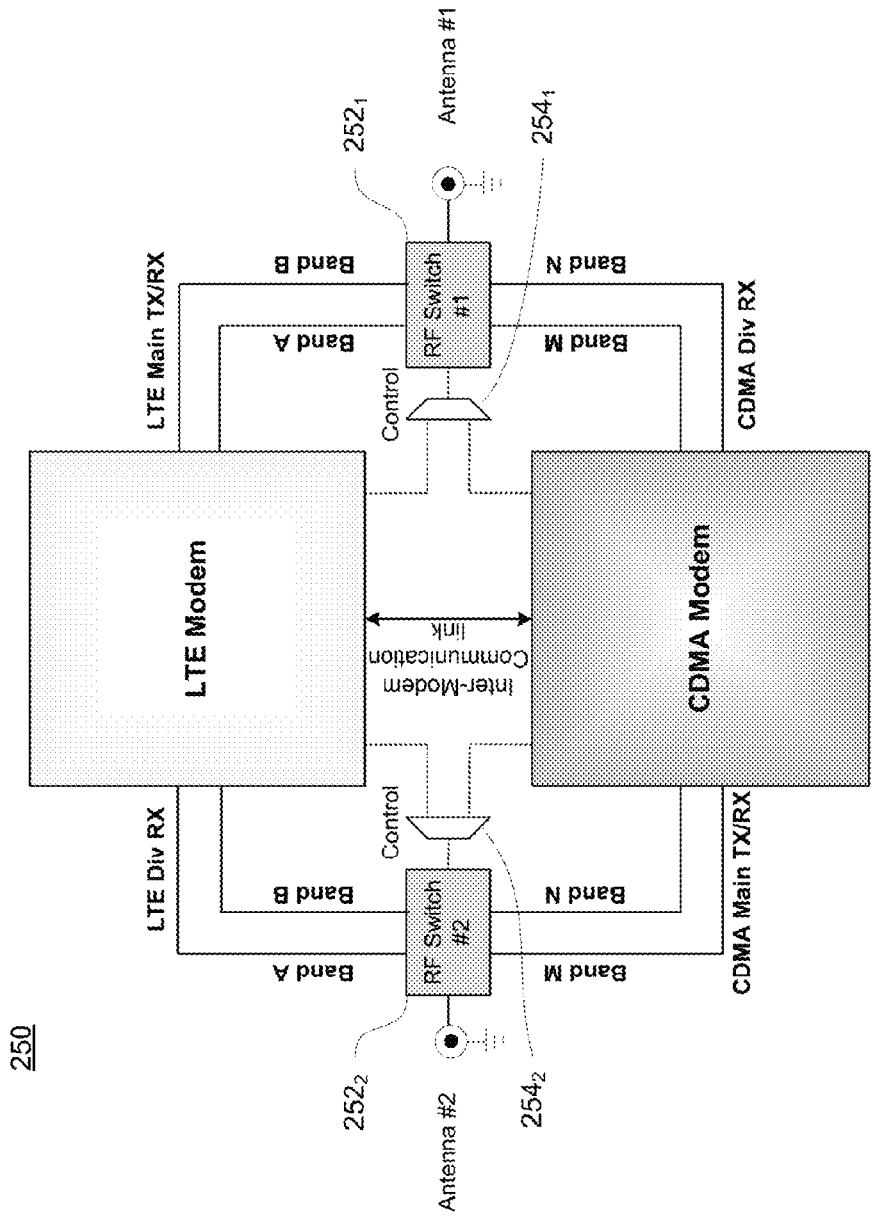
FIG. 10 illustrates Mobile Station RF antenna connections for dual band modems in accordance with aspects of the present invention.

This flexibility provides substantial benefits to the overall system. Performance benefits include the following. First, such adaptive MIMO operation provides better neighbor cell reception and tracking to improve hand-offs for inter-RAT operation. There is negligible reduction to user data throughput in one RAT while performing neighbor cell measurements in the other RAT. This mode of operation is especially useful for the case where the MS has to use the CDMA RAT for voice calls and LTE for data calls. The present invention allows monitoring of CDMA voice calls while in active data connection on LTE RAT. Other benefits include cost and form factor savings. For instance, the embodiment illustrated in FIG. 10 allows a system designer to eliminate dedicated antennas for each RAT. For a MS that supports multiple bands, the adaptive architecture provides even greater benefits by reducing the number of redundant components.

Figure 16B:
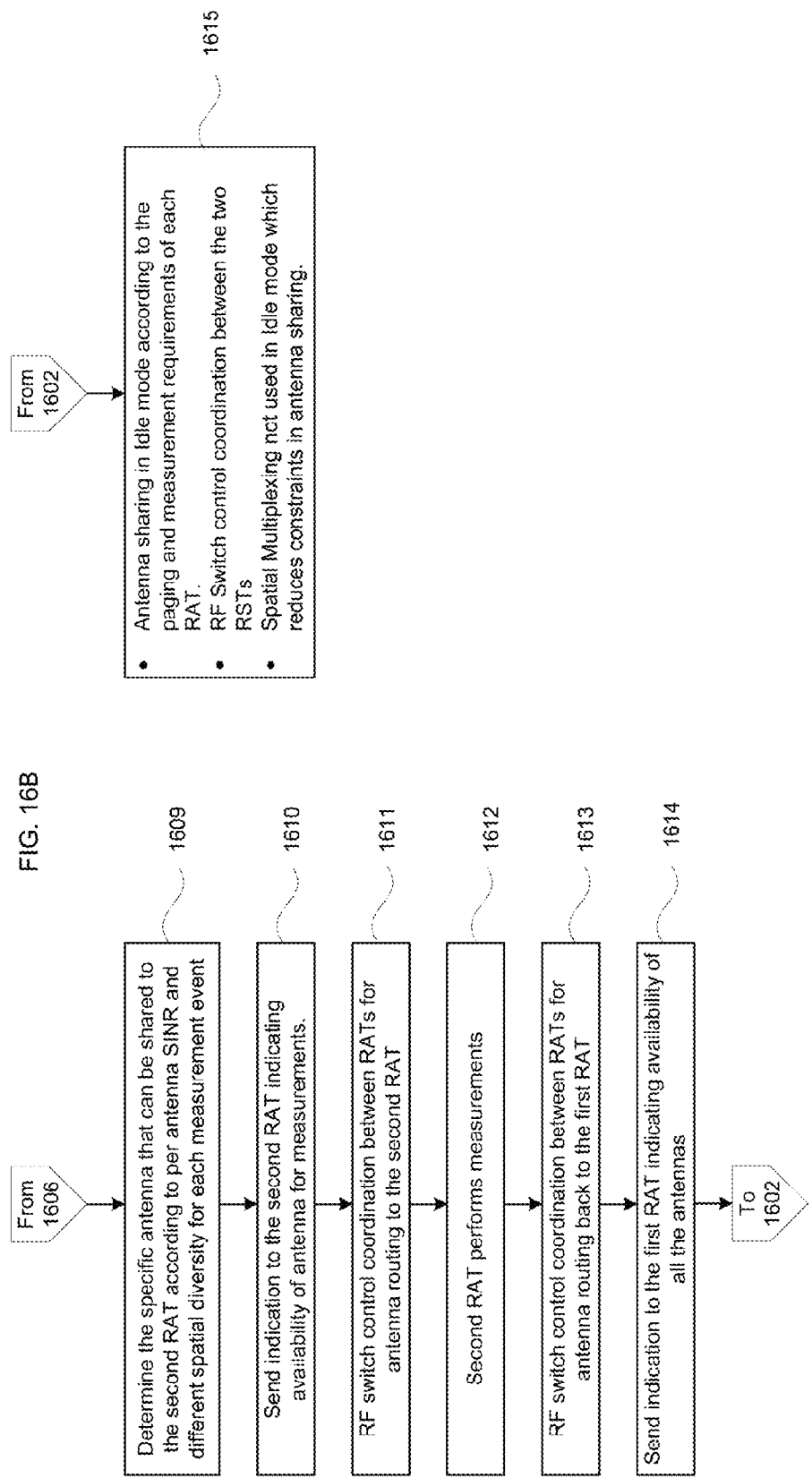
Figure 17:
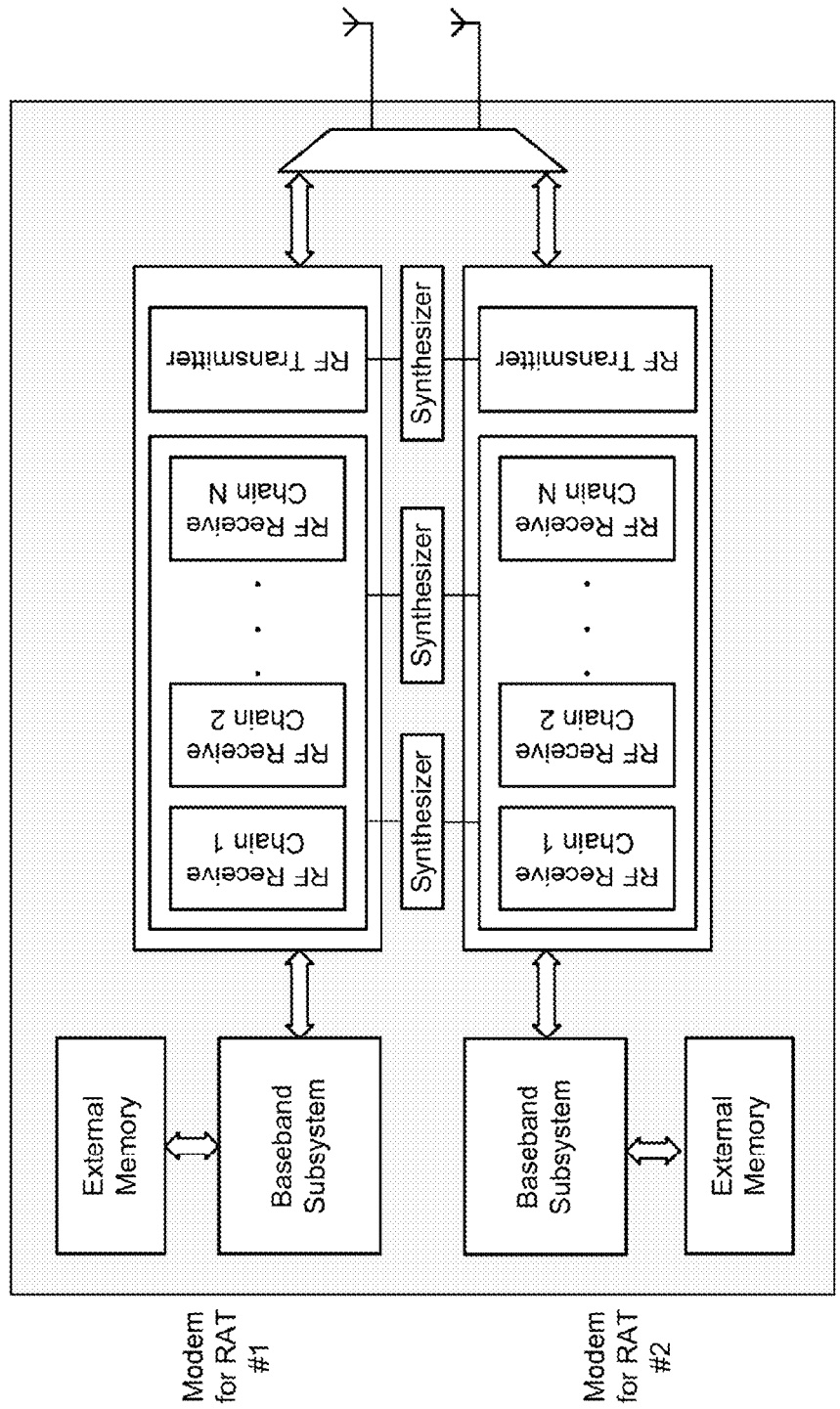
FIG. 17 illustrates multiple modems each having a transmitter and a plurality of radio frequency receive chains. There are separate synthesizers for the transmitters and the receive chains, and a multiplexer couples the transmitters and receive chains to at least two antennae.

The specific steps described above may be performed in different sequences and combinations. The flowchart contained in FIGS. 16A-B is an example embodiment of the present disclosure. The processing block 1601 performs the initialization based on the a priori information about the client terminal's capabilities. The remainder of the description is for the case where the first RAT is used for active connection and the second RAT is used for measurements. The same description is applicable if the second RAT is used for active connection and the first RAT is used for measurements. The processing block 1602 determines whether the client terminal (e.g., a wireless mobile device) is in Connected mode where it may be performing data transfer. If it is in Connected mode, the processing block 1603 performs SINR measurements. Next the processing block 1604 performs RI estimation. The processing block 1605 determines the required number of antennas for supporting the rank determined by the RI estimation. Rank is the number of layers in a Spatial Multiplexing mode.

The processing block 1606 determines whether the required minimum number of antennas is less than the maximum number of antennas supported by the client terminal. If the required minimum number of antennas is less than the maximum available antennas in the client terminal, the processing continues in block 1609. If the required minimum number of antennas is equal to the maximum available antennas in the client terminal, the processing continues in block 1607 where the client terminal reports to the network the RI value of one less than the estimated RI. Next as indicated in processing block 1608 the client terminal waits for the network to start transmission in downlink using the last reported RI as the transmission mode. Next the processing continues in block 1609 where a determination is made regarding which particular antenna is to be shared to the second RAT. This decision is based on the estimated SINR for each antenna and the spatial diversity. In one embodiment, the antenna with the lowest SINR may be always shared to the second RAT for measurements. In another embodiment, the client terminal may alternate between two different antennas for each measurement event. In yet another embodiment, the client terminal may select the antenna according to the frequency band of the second RAT for which the measurements to be made. Once the selection of the particular antenna to be shared to the second RAT is made, the first RAT provides an indication in block 1610 to the second RAT about the available antenna. Next the processing block 1611 performs the actual task of switching the selected antenna connection to the second RAT. In processing block 1612 the second RAT performs measurements using the allocated antenna. Next the RF switch control in block 1613 routes the shared antenna back to the first RAT. In processing block 1614 the second RAT provides indication to the first RAT that the shared antenna is assigned back to the first RAT.

Returning to processing block 1602, if the client terminal is not in Connected mode in any of the RATs, the sharing of the antennas may be performed without dependence on the SINR or RI of the current transmission mode. The processing block 1615 performs the paging and measurements on the first RAT and measurements on the second RAT by using the antenna sharing steps implemented in blocks 1609 to 1614. These operations may be performed by one or more processing devices in the modems. By way of example only, the processing devices may be controllers and/or signal processing units, e.g., of the respective RF subsystems, the baseband subsystems, or a combination thereof.

The algorithms/processes of determining when the antennas are available for use by the other RAT and coordination of the RF switch control may be implemented in software, hardware, firmware or any combination. In one example, software embodying the algorithms/processes can be executed in an MCU, SPU or in both. The software may reside in internal or external memory and any data may be stored in such memory. The hardware may be an application specific integrated circuit ("ASIC"), field programmable gate array ("FPGA"), discrete logic components or any combination of such devices.

Given the aforementioned features, it should be understood that the present invention may be utilized in a wide variety of situations. In one alternative, it is preferred that the exact time and duration of the measurement for the neighbor base station may be flexible and need not require any co-ordination with the base station. In this case, a processor or algorithm/application which is part of the baseband subsystem or elsewhere in the mobile station may decide when to do the measurement with the neighbor base station and when to use both the receive chains to communicate with the serving base station. This process allows for the combination of the benefits of multiple receive chains for performance improvement and neighbor base station power measurement.

As explained above, the present invention permits flexible allocation of the RF antennas which may be done on an as needed basis. The RF antenna allocation strategy desirably balances the need for measurements with the need for improved performance. The decision of which antenna is tuned for the serving base station in one RAT and which antenna is tuned for measurements in another RAT can be made by various parameters that include but not limited to a priori information about the system and the client terminal, control messages describing the attributes of the communication link, signal condition indicators such as SINR, RI, etc.

The reception quality in one antenna may be different from the reception quality in another antenna due to spatial diversity. The spatial diversity varies as a function of the frequency of operation. Therefore, in case of two RATs operating in two different frequency bands, the optimal antenna for each RAT may be determined based on measurements. This selection may be reevaluated on a periodic basis. When both the antennas are connected to one RAT, it may make measurements on signals received on both the antennas. When allocating one of the antennas to the second RAT, the antenna with lower SINR may be allocated to the other RAT. This is because the quality of the active data transfer link is more critical and the antenna with better signal quality helps in both receive and transmit directions while the antenna with inferior signal quality is used for receive purpose only. The a priori information about the system includes the neighbor cell list in one RAT describing the cells in the other RAT including the frequency band of operation. The frequency band support capability of the client terminal is one of the a priori information about the client terminal. The allocated antenna for the measurements may be alternated between the available antennas to achieve spatial diversity for measurements also as described in the processing block 1609.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein. For instance, flexible allocation of receive chains may be done for any embodiment of the invention. Such allocation may be based on any or all of the parameters as set forth herein, including but not limited to SNR, CINR, RSSI, etc. And with respect to the methods described herein, it should be understood that the operations do not have to be performed in the precise order described above. Rather, various steps can be handled in reverse order, non-sequential order, or simultaneously.

The invention claimed is:

1. A communication subsystem for use in a wireless mobile station, the communication subsystem comprising:
   a first modem configured to support a first radio access technology, the first modem including a first radio frequency subsystem including a transmitter and a plurality of receive chains respectively configured to transmit and receive information according to the first radio access technology;
   a second modem configured to support a second radio access technology, the second modem including a second radio frequency subsystem including a transmitter and a plurality of receive chains respectively configured to transmit and receive information according to the second radio access technology;
   the first and second modems being communicatively coupled via an inter-modem communication link;
   one or more first frequency synthesizers coupled to the transmitters of the first and second modems, the one or more first frequency synthesizers configured to generate local oscillating signals for the transmitters; and
   one or more second frequency synthesizers coupled to the pluralities of receive chains of the first and second modems, the one or more second frequency synthesizers configured to generate local oscillating signals for the pluralities of receive chains;
   the transmitter and the plurality of receive chains of the first modem being coupled to at least two antennas through one or more multiplexers, and the transmitter and the plurality of receive chains of the second modem being coupled to the at least two antennas through the one or more multiplexers;
   wherein when a given one of the first and second modems is in active communication, via a first one of the at least two antennas, with a wireless communication network according to that modem's radio access technology, the other one of the first and second modems is configured to simultaneously use another one of the at least two antennas to measure one or more signal or network parameters associated with that modem's radio access technology; and
   wherein the communication subsystem is further configured to determine a required minimum number of antennas for supporting a rank determined by rank indication estimation, the rank identifying a number of layers in a spatial multiplexing mode, and to determine whether the required minimum number of antennas is less than a maximum available number of the at least two antennas of the wireless mobile station.

2. The communication subsystem of claim 1, wherein the given modem is configured to determine whether to use only one of its plurality of receive chains and the first antenna or two or more of its plurality of receive chains and the at least two antennas for the given modem's active connection, based on a prevailing downlink transmission mode and signal conditions.

3. The communication subsystem of claim 2, wherein when the given modem determines to use only one of its plurality of receive chains and the first antenna, the given modem is configured to inform the other modem, via the inter-modem communication link, of the determination.

4. The communication subsystem of claim 3, wherein when the other modem is informed of the determination, the other modem is configured to control the other one of the at least two antennas via the one or more multiplexers, and to take measurements of the one or more signal or network parameters.

5. The communication subsystem of claim 4, wherein upon completion of the measurements, the other modem returns control of the other one of the at least two antennas to the given modem.

6. The communication subsystem of claim 1, wherein the first modem and the second modem support multiple frequency bands, and each of the first and second modems is configured to perform measurements of the one or more signal or network parameters with that modem's radio access technology utilizing the at least two antennas via the one or more multiplexers.

7. The communication subsystem of claim 1, wherein the given modem is configured to perform signaling with the wireless communication network to ensure that the given modem is able to free up the other one of the at least two antennas for a selected duration to enable the other modem to perform the measurements.

8. The communication subsystem of claim 1, wherein:
   the given modem is configured to use the first antenna for primary receive and transmit operations, and is configured to use the other one of the at least two antennas for diversity reception; and
   the other modem is configured to use the other one of the at least two antennas for primary receive and transmit operations, and is configured to use the first antenna for diversity reception.

9. The communication subsystem of claim 1, wherein:
   the first modem includes a first baseband subsystem communicatively coupled to the first radio frequency subsystem; and
   the second modem includes a second baseband subsystem communicatively coupled to the second radio frequency subsystem.

10. The communication subsystem of claim 1, wherein:
   when the required minimum number of antennas is less than the maximum available number of antennas, the communication subsystem is further configured to:
      select which particular antenna of the wireless mobile station is to be shared, by the first modem, with the second modem, the selection being based on an estimated signal to interference and noise ratio (SINR) for each antenna; and
      provide an indication to the second modem about the selected antenna to be shared; and
      switch a connection for the selected antenna to the second modem.

11. A wireless mobile station, comprising:
   a baseband subsystem including one or more controllers and one or more signal processing units operatively connected to the one or more controllers;

a first radio frequency subsystem operatively connected to the baseband subsystem, the first radio frequency subsystem including:
  a transmitter and a plurality of receive chains respectively configured to transmit and receive information according to a first radio access technology;
a second radio frequency subsystem operatively connected to the baseband subsystem, the second radio frequency subsystem including:
  a transmitter and a plurality of receive chains respectively configured to transmit and receive information according to a second radio access technology;
the first and second radio subsystems being communicatively coupled via a communication link;
one or more first frequency synthesizers coupled to the transmitters of the first and second radio subsystems, the one or more first frequency synthesizers configured to generate local oscillating signals for the transmitters; and
one or more second frequency synthesizers coupled to the pluralities of receive chains of the first and second radio frequency subsystems, the one or more second frequency synthesizers configured to generate local oscillating signals for the pluralities of receive chains;
the transmitter and the plurality of receive chains of the first radio frequency subsystem being coupled to at least two antennas of the wireless mobile station through one or more multiplexers, and the transmitter and the plurality of receive chains of the second radio frequency subsystem being coupled to the at least two antennas through the one or more multiplexers;
wherein when a given one of the first and second radio frequency subsystem is in active communication, via a first one of the at least two antennas, with a wireless communication network according to that radio frequency subsystem's radio access technology, the other one of the first and second radio frequency subsystems is configured to simultaneously use another one of the at least two antennas to measure one or more signal or network parameters associated with that radio frequency subsystem's radio access technology; and
wherein the wireless mobile station is configured to determine a required minimum number of antennas for supporting a rank determined by rank indication estimation, the rank identifying a number of layers in a spatial multiplexing mode, and to determine whether the required minimum number of antennas is less than a maximum available number of the at least two antennas of the wireless mobile station.

12. The wireless mobile station of claim 11, wherein the given radio frequency subsystem is configured to determine whether to use only one of its plurality of receive chains and the first antenna or two or more of its plurality of receive chains and the at least two antennas for the given radio frequency subsystem's active connection, based on a prevailing downlink transmission mode and signal conditions.

13. The wireless mobile station of claim 12, wherein when the given radio frequency subsystem determines to use only one of its plurality of receive chains and the first antenna, the given radio frequency subsystem is configured to inform the other radio frequency subsystem, via the communication link, of the determination.

14. The wireless mobile station of claim 13, wherein when the other radio frequency subsystem is informed of the determination, the other radio frequency subsystem is configured to control the other one of the at least two antennas via the one or more multiplexers, and to take measurements of the one or more signal or network parameters.

15. The wireless mobile station of claim 14, wherein upon completion of the measurements, the other radio frequency subsystem returns control of the other one of the at least two antennas to the given radio frequency subsystem.

16. The wireless mobile station of claim 11, wherein the first and the second radio frequency subsystems each support multiple frequency bands, and each of the first and second radio frequency subsystems is configured to perform measurements of the one or more signal or network parameters with that radio frequency subsystem's radio access technology utilizing the at least two antennas via the one or more multiplexers.

17. The wireless mobile station of claim 11, wherein the given radio frequency subsystem is configured to perform signaling with the wireless communication network to ensure that the given radio frequency subsystem is able to free up the other one of the at least two antennas for a selected duration to enable the other radio frequency subsystem to perform the measurements.

18. The wireless mobile station of claim 11, wherein:
the given radio frequency subsystem is configured to use the first antenna for primary receive and transmit operations, and is configured to use the other one of the at least two antennas for diversity reception; and
the other radio frequency subsystem is configured to use the other one of the at least two antennas for primary receive and transmit operations, and is configured to use the first antenna for diversity reception.

19. The wireless mobile station of claim 11, wherein:
the baseband subsystem comprises a first baseband subsystem having a first one of the controllers and a first one of the signal processing units, and a second baseband subsystem having a second one of the controllers and a second one of the signal processing units;
the first radio frequency subsystem is operatively connected to the first baseband subsystem; and
the second radio frequency subsystem is operatively connected to the second baseband subsystem.

20. The wireless mobile station of claim 11, wherein:
when the required minimum number of antennas is less than the maximum available number of antennas, the wireless mobile station is further configured to:
  select which particular antenna of the wireless mobile station is to be shared, by the first modem, with the second modem, the selection being based on an estimated signal to interference and noise ratio (SINR) for each antenna; and
  provide an indication to the second modem about the selected antenna to be shared; and
  switch a connection for the selected antenna to the second modem.

21. A method of communication in a wireless mobile station having a first modem configured to support a first radio access technology and a second modem configured to support a second radio access technology, the method comprising:
determining, by one or more processing devices of the wireless mobile station, a required minimum number of antennas for supporting a rank determined by rank indication estimation, the rank identifying a number of layers in a spatial multiplexing mode;
determining, by the one or more processing devices, whether the required minimum number of antennas is less than a maximum available number of antennas of the wireless mobile station;

when the required minimum number of antennas is less than the maximum available number of antennas:

selecting which particular antenna of the wireless mobile station is to be shared, by the first modem, with the second modem, the selection being based on an estimated signal to interference and noise ratio (SINR) for each antenna;

the first modem providing an indication to the second modem about the selected antenna to be shared; and switching a connection for the selected antenna to the second modem.

22. The method of claim 21, further comprising, after switching the connection, the second modem performing measurements of one or more signal or network parameters associated with the second modem's radio access technology using the selected antenna.

23. The method of claim 22, further comprising, after performing the measurements, routing control of the selected antenna back to the first modem.

24. The method of claim 23, wherein the second modem provides an indication to the first modem that the selected antenna is assigned back to the first modem.

25. The method of claim 21, wherein an antenna having the lowest SINR is selected to be shared to the second modem for measurements.

26. The method of claim 21, wherein the wireless mobile station alternates between two different antennas for each measurement event.

27. The method of claim 21, wherein selection of the particular antenna is performed according to a frequency band of the second modem for which measurements are to be made.

28. The method of claim 21, wherein, when the required minimum number of antennas is equal to the maximum available number of antennas, the wireless mobile station reports to a wireless communication network a rank indication value of one less than the estimated rank indication.

29. The method of claim 28, further comprising waiting for the wireless communication network to start downlink transmission using a last reported rank indication as a transmission mode.

30. The method of claim 21, wherein, when the wireless mobile station is not in a connected mode in either of the first or second modems, sharing of the antennas of the wireless mobile station is performed without dependence on the SINR or rank indication of a current transmission mode.

* * * * *